US012585307B2

(12) United States Patent
Kanas et al.

(10) Patent No.: US 12,585,307 B2
(45) Date of Patent: Mar. 24, 2026

(54) RETRACTABLE DISPLAYS FOR ELECTRONIC MEETINGS

(71) Applicant: Hewlett-Packard Development Company, L.P., Spring, TX (US)

(72) Inventors: Derek Kyle Joseph Kanas, Spring, TX (US); Christopher Steven, Spring, TX (US); Andre Da Fonte Lopes da Silva, Palo Alto, CA (US); Guoxing Yang, Spring, TX (US)

(73) Assignee: Hewlett-Packard Development Company L.P., Spring, TX (US)

( * ) Notice: Subject to any disclaimer, the term of this patent is extended or adjusted under 35 U.S.C. 154(b) by 110 days.

(21) Appl. No.: 18/565,981

(22) PCT Filed: Jun. 30, 2021

(86) PCT No.: PCT/US2021/039902
§ 371 (c)(1),
(2) Date: Nov. 30, 2023

(87) PCT Pub. No.: WO2023/277910
PCT Pub. Date: Jan. 5, 2023

(65) Prior Publication Data
US 2024/0255998 A1 Aug. 1, 2024

(51) Int. Cl.
*G06F 1/16* (2006.01)
*H04N 7/15* (2006.01)

(52) U.S. Cl.
CPC .......... *G06F 1/1652* (2013.01); *G06F 1/1601* (2013.01); *H04N 7/15* (2013.01)

(58) Field of Classification Search
CPC ...... G06F 1/1601; G06F 1/1652; G06F 3/147; G06F 3/1454; G16Y 10/70; H04N 7/15; G09G 2380/02
See application file for complete search history.

(56) References Cited

U.S. PATENT DOCUMENTS

| | | | | |
|---|---|---|---|---|
| 11,792,028 B1 * | 10/2023 | Sylvester | .............. | G06F 3/0482 709/204 |
| 2002/0051098 A1 | 5/2002 | Morita et al. | | |
| 2003/0211888 A1 * | 11/2003 | Wolinsky | .............. | A63F 13/332 463/41 |
| 2005/0117130 A1 | 6/2005 | Bohn et al. | | |
| 2005/0237269 A1 | 10/2005 | Connor et al. | | |
| 2006/0107566 A1 | 5/2006 | Van Rens | | |
| 2017/0116425 A1 | 4/2017 | Chang | | |
| 2017/0243171 A1 * | 8/2017 | Bellamy | ............. | H04L 12/1822 |
| 2021/0034098 A1 * | 2/2021 | Kang | .................... | G06F 1/1601 |
| 2022/0131979 A1 * | 4/2022 | Pham | ..................... | G10L 17/18 |
| 2023/0350196 A1 * | 11/2023 | Lajunen | ............... | G02B 5/1819 |

* cited by examiner

*Primary Examiner* — Stacy Khoo
(74) *Attorney, Agent, or Firm* — Quarles & Brady LLP

(57) ABSTRACT

A method for conducting electronic meetings using retractable displays, includes receiving by a conference hub including a retractable display, an electronic meeting agenda for an electronic meeting. The method includes identifying a position of a retractable display by extrapolating contextual information from the received electronic meeting agenda, by identifying a selection of a display included in the received electronic meeting agenda, or combinations thereof. The method also includes initiating the electronic meeting by preparing the retractable display in the identified position.

20 Claims, 6 Drawing Sheets

100

RECEIVING BY A CONFERENCE
HUB INCLUDING A
RETRACTABLE DISPLAY, AN
ELECTRONIC MEETING AGENDA
— 101

IDENTIFYING A POSITION OF
THE RETRACTABLE DISPLAY
— 103

INITIATING THE ELECTRONIC
MEETING BY PREPARING THE
RETRACTABLE DISPLAY IN THE
IDENTIFIED POSITION
— 105

COMPUTER-READABLE STORAGE MEDIUM 209

RECEIVE AS INPUT, AN ELECTRONIC MEETING AGENDA FOR AN ELECTRONIC MEETING 211

IDENTIFY A POSITION OF A RETRACTABLE DISPLAY, BASED ON INFORMATION INCLUDED IN THE RECEIVED ELECTRONIC MEETING AGENDA 213

PREPARE THE RETRACTABLE DISPLAY IN THE IDENTIFIED POSITION TO INITIATE THE ELECTRONIC MEETING 215

PROCESSOR 207

202

RETRACTABLE DISPLAYS FOR ELECTRONIC MEETINGS

BACKGROUND

Electronic meetings refer to various types of online conferencing and collaborative services including webinars (web seminars) and webcasts. In general, electronic meetings are made possible by Internet technologies, particularly by User Datagram Protocol (UDP) and Transmission Control Protocol (TCP)/Internet Protocol (IP) connections. Services may allow real-time point-to-point communications as well as multicast communications from one sender to many receivers. Electronic meetings offer data streams of text-based messages, voice and video chat to be shared simultaneously, across geographically dispersed locations. Applications for electronic meetings include training events, lectures, or presentations from a web-connected computer to other web-connected computers.

Electronic meetings may be held over media as audio, video, or computer-based communications. Electronic meetings can serve as an alternative to face-to-face meetings. Electronic meetings use a network of personal computers to improve communication in a meeting. Meetings can be held in a room or can be held virtually around the world. Members of an electronic meeting can participate at the same or different times. Electronic meetings may be facilitated by computing devices. Such electronic meetings facilitate creative problem solving and decision-making of groups within or across organizations.

DETAILED DESCRIPTION

Figure 1:
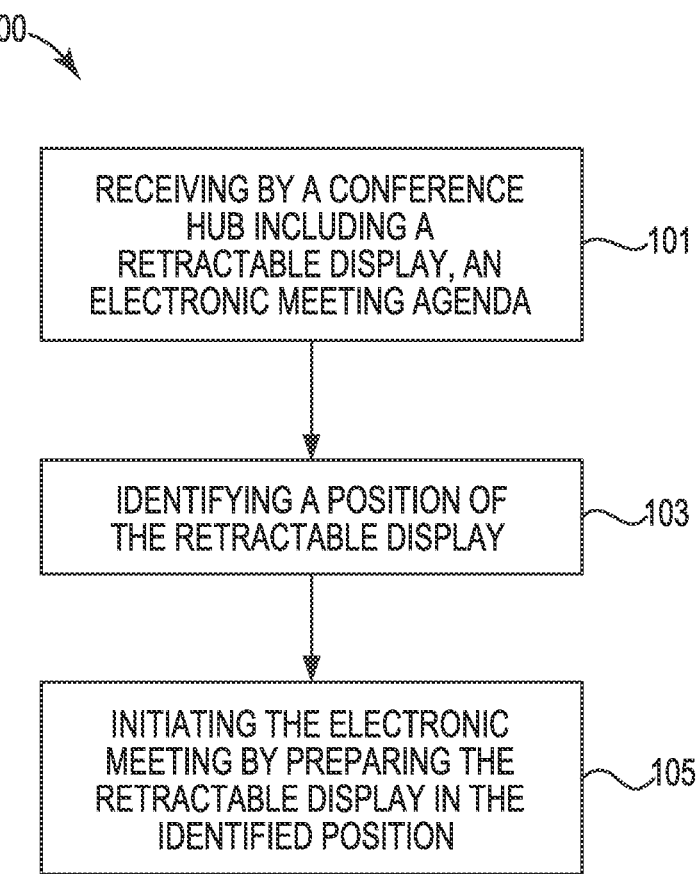
FIG. 1 illustrates an example block diagram of a method for conducting electronic meetings using retractable displays, in accordance with the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Dedicated electronic meeting devices are used in many of today's offices. Conference rooms may have a central control unit with an audio system and a monitor or television on the wall for presentations or live video. For more intimate face to face meetings, the display may be a distraction. The control unit may be connected to the display, but the connection for the user is not always seamless.

Retractable displays for electronic meetings, in accordance with the present disclosure, can roll away and be hidden when not in use. Moreover, examples of the present disclosure allow for everything needed for electronic meetings to be included in one device. Yet further, retractable displays for electronic meetings, in accordance with the present disclosure, allow for intelligent preparation of visual displays for each meeting, among other benefits.

A non-limiting example in accordance with the present disclosure includes a method of conducting electronic meetings using retractable displays. In some examples, the method comprises receiving by a conference hub including a retractable display, an electronic meeting agenda for an electronic meeting. The method includes identifying a position of a retractable display by extrapolating contextual information from the received electronic meeting agenda, by identifying a selection of a display included in the received electronic meeting agenda, or combinations thereof. The method further includes initiating the electronic meeting by preparing the retractable display in the identified position.

In another example, an apparatus for conducting electronic meetings using retractable displays includes a non-transitory computer-readable storage medium. The non-transitory computer-readable storage medium comprises instructions that when executed cause a computing device to receive as input, an electronic meeting agenda for an electronic meeting. The non-transitory computer-readable storage medium also includes instructions that when executed cause the computing device to identify a position of a retractable display, based on information included in the received electronic meeting agenda. Further, the non-transitory computer-readable storage medium also includes instructions that when executed cause the computing device to prepare the retractable display in the identified position to initiate the electronic meeting.

As a further non-limiting example, an apparatus for conducting electronic meetings using retractable displays includes a processor, a retractable display area to generate a visual display based on a communication from the processor, and a non-transitory computer-readable storage medium. The non-transitory computer-readable storage medium includes instructions that when executed cause the processor to receive as input, an electronic meeting agenda for an electronic meeting. The non-transitory computer-readable storage medium includes instructions that when executed cause the processor to identify a position of the retractable display, based on the received electronic meeting agenda. The non-transitory computer-readable storage medium includes instructions that when executed cause the processor to prepare the retractable display in the identified position to initiate the electronic meeting.

Examples of the present disclosure allow for a more seamless and optimized conference space in which electronic meeting devices are combined into one device. In accordance with the present disclosure, if a visual display will not be used during an electronic meeting, the visual display will not be visible. An apparatus in accordance with the present disclosure allows for the creation of meeting rooms in spaces such as open areas or rooms with all glass walls where mounting a display might not be wanted.

Turning now to the figures, FIG. 1 illustrates an example block diagram of a method 100 for conducting electronic meetings using retractable displays, in accordance with the present disclosure. At 101, the method 100 includes receiving by a conference hub including a retractable display, an electronic meeting agenda for an electronic meeting.

As used herein, a conference hub refers to or includes an apparatus including a plurality of components for conducting an electronic meeting. Each of the plurality of components may include circuitry for providing a feature of an electronic meeting. For instance, a component of the conference hub may include circuitry for providing audio services, a component of the conference hub may include circuitry for providing visual services, and a component of the conference hub may include circuitry for providing communications services such as over an IP network. The conference hub may include more or fewer components, as discussed further herein. For instance, the conference hub may include a motor to enable changing a position of a retractable display, a display vertical support operable to support the retractable display, a processor, and a removable graphic user interface communicatively coupled to the processor, among other components.

As used herein, a retractable display refers to or includes a visual display that is capable of extending from a retractable display area of the conference hub, and of being enclosed within the retractable display area of the conference hub, and/or being projected from the retractable display area of the conference hub. Also, as used herein, a visual display refers to or includes be any form of surface and/or light projection capable of presenting visual content. Non-limiting examples of a visual display include a flexible display, a projector screen and light projector, and an optical waveguide, among other examples. As used herein, a flexible display refers to or includes an output device for presentation of information in visual form, and which is capable of bending and/or folding. Non-limiting examples of a flexible display include a light emitting diode (LED), an organic light emitting diode (OLED), a liquid crystal display (LCD), a cathode ray tube display (CRT), and/or a touch-screen, among other non-limiting examples.

The conference hub may help facilitate an electronic meeting, which may or may not include the use of a visual display. As used herein, an electronic meeting refers to or includes any type of online conferencing and collaborative service, including webinars (web seminars) and webcasts. An electronic meeting may be scheduled and conducted according to an electronic meeting agenda. As used herein, an electronic meeting agenda refers to or includes an electronic communication which lists information pertinent for the execution of the electronic meeting. Information pertinent for the execution of the electronic meeting is also referred to herein as contextual information from the received electronic meeting agenda. Non-limiting examples of information pertinent for the execution of the electronic meeting (i.e., contextual information) includes attendees of the electronic meeting, topics to be discussed during the electronic meeting, materials to be reviewed and/or presented during the electronic meeting, a date and/or time for the electronic meeting, phone numbers for attendees, an IP address and/or IP addresses for a web-based platform upon which the electronic meeting will be held, among others.

In various examples, the conference hub may receive an electronic meeting agenda for an electronic meeting. For instance, the conference hub may receive from a participant of the electronic meeting, an electronic communication which include the electronic meeting agenda. In some examples, the conference hub may be listed as a resource available to participants when scheduling electronic meetings, and may therefore be capable of receiving reservations and/or requests for participating in an electronic meeting.

Based on the information included in the electronic meeting agenda, the conference hub may automatically initiate the electronic meeting by preparing various components of the conference hub.

At 103, the method 100 includes identifying a position of a retractable display by extrapolating contextual information from the received electronic meeting agenda, by identifying a selection of a display included in the received electronic meeting agenda, or combinations thereof. As used herein, a position of a retractable display refers to or includes an amount to which the retractable display extends from, and/or is projected from, the conference hub. For instance, in examples in which the retractable display includes a flexible display, the position of the retractable display refers to or includes an amount to which the flexible display extends from the conference hub. In examples in which the retractable display includes a projector screen, the position of the retractable display refers to or includes an amount to which the projector screen extends from the conference hub. In examples in which the retractable display includes an optical waveguide, the position of the retractable display refers to or includes an indication of whether an optical signal is displayed and/or an angle from the conference hub at which the optical signal is displayed.

As discussed herein, the contextual information from the received electronic meeting agenda may include various pieces of information. The contextual information, which includes information pertinent to the execution of the electronic meeting, may include lists of attendees, content to be discussed and/or presented, among other pieces of information. Based on this contextual information, the conference hub may identify a position of the retractable display. For instance, if a presentation is attached to the electronic meeting agenda, the conference hub may extrapolate that a presentation will be provided and the visual display will be used during the electronic meeting. Based on the determination that a presentation will be provided and the visual display will be used, the conference hub may identify that the retractable display is to be extended from the conference hub during the electronic meeting. In some examples, the conference hub may use artificial intelligence to extrapolate contextual information from the received electronic meeting agenda and identify the position of the retractable display.

In some examples, the conference hub may identify the position of the retractable display based on a selection of a display included in the received electronic meeting agenda. For instance, the electronic meeting agenda may include selectable buttons, toggle switches, and/or drop-down menus for identifying whether the visual display is extended from the conference hub, and if so, by how much.

In some examples, identifying the position of the retractable display includes selecting a closed mode of operation in which the retractable display is enclosed within the conference hub responsive to a determination that a visual display will not be included in the electronic meeting. As used herein, a closed mode of operation refers to or includes a mode of operation of the conference hub in which the visual display is not extended from the conference hub. In the closed mode of operation, the visual display may be contained within the conference hub and/or turned off, as appropriate based on the type of visual display used.

In some examples, identifying the position of the retractable display includes selecting a notification mode of operation where the retractable display is partially extended from the conference hub responsive to a determination that notifications will be included in the electronic meeting and that a visual display will not be included in the electronic meeting. As used herein, a notification mode of operation refers to or includes a mode of operation of the conference hub in which the visual display is partially extended from the conference hub and or the optical signal is displayed just above the conference hub, as illustrated and discussed further herein.

In some examples, identifying the position of the retractable display includes selecting a presentation mode of operation where the retractable display is fully extended from the conference hub responsive to a determination that a visual display will be included in the electronic meeting. As used herein, a presentation mode of operation refers to or includes a mode of operation of the conference hub in which the visual display is fully extended from the conference hub and/or the optical signal is fully displayed from the conference hub, as illustrated and discussed further herein.

As discussed herein, the conference hub may use artificial intelligence to extrapolate contextual information from the received electronic meeting agenda and identify the position of the retractable display. For instance, in some examples, identifying the position of the retractable display includes selecting a mode of operation of the retractable display based on keywords identified in the electronic meeting agenda. Identification of words such as "present" or "presentation" may indicate that the visual display will be used, and the mode of operation of the retractable display may be selected accordingly. Different and/or additional keywords may be identified, such as "attached", "document", "review", "view", and "slides", among others. As another example, identifying the position of the retractable display may include selecting a mode of operation of the retractable display based on a determination that each attendee of the electronic meeting is located in a different respective geographic location.

At 105, the method 100 includes initiating the electronic meeting by preparing the retractable display in the identified position. For instance, the conference hub may identify that a presentation mode of operation will be used during the electronic meeting. At the time of the meeting and/or in advance of the meeting, the conference hub may automatically prepare the retractable display in the identified position, i.e., the presentation mode in this particular example. If the conference hub identifies that the notification mode of operation will be used, then at the time of the meeting and/or in advance of the meeting, the conference hub may automatically prepare the retractable display in the notification mode of operation. Similarly, if the conference hub identifies that the closed mode of operation will be used, then at the time of the meeting and/or in advance of the meeting, the conference hub may automatically prepare the retractable display in the closed mode of operation. As used herein, to automatically prepare the retractable display refers to or includes the conference hub arranging the retractable display in the identified position without an express prompt from a user to do so.

In some examples, the method further includes extrapolating contextual information during the electronic meeting, and revising the position of the retractable display during the electronic meeting and based on the extrapolated contextual information. For instance, at 103 the method 100 may include identifying the notification mode of operation for the electronic meeting, but during the course of the electronic meeting verbal and/or written communications indicate that the visual display will be used. As an example, a user may say and/or write phrases such as "share my screen", "review the document" indicative of a participant of the electronic meeting presenting some material. Responsive to a determination that the visual display will be used, the conference hub may revise the position of the retractable display from the notification mode of operation to the presentation mode of operation.

As another example, the conference hub may identify that a presentation is complete but the electronic meeting has not yet concluded. Responsive to this determination, the conference hub may revise the position of the retractable display from the presentation mode of operation to the notification mode of operation. As yet further examples, the conference hub may revise the position of the retractable display from the closed mode to the notification mode, from the closed mode to the presentation mode, from the notification mode to the presentation mode, from the presentation mode to the notification mode, from the presentation mode to the closed mode, and/or from the notification mode to the closed mode. The revision of the position of the retractable display may be based in whole or in part on written and/or verbal communications received during the course of the electronic meeting.

In some examples, the method further includes revising the position of the retractable display during the electronic meeting and responsive to user input received by the conference hub. For instance, a participant of the electronic meeting may provide input on a removable graphic user interface communicatively coupled to the processor of the conference hub, instructions to move from one mode of operation to another.

Figure 2:
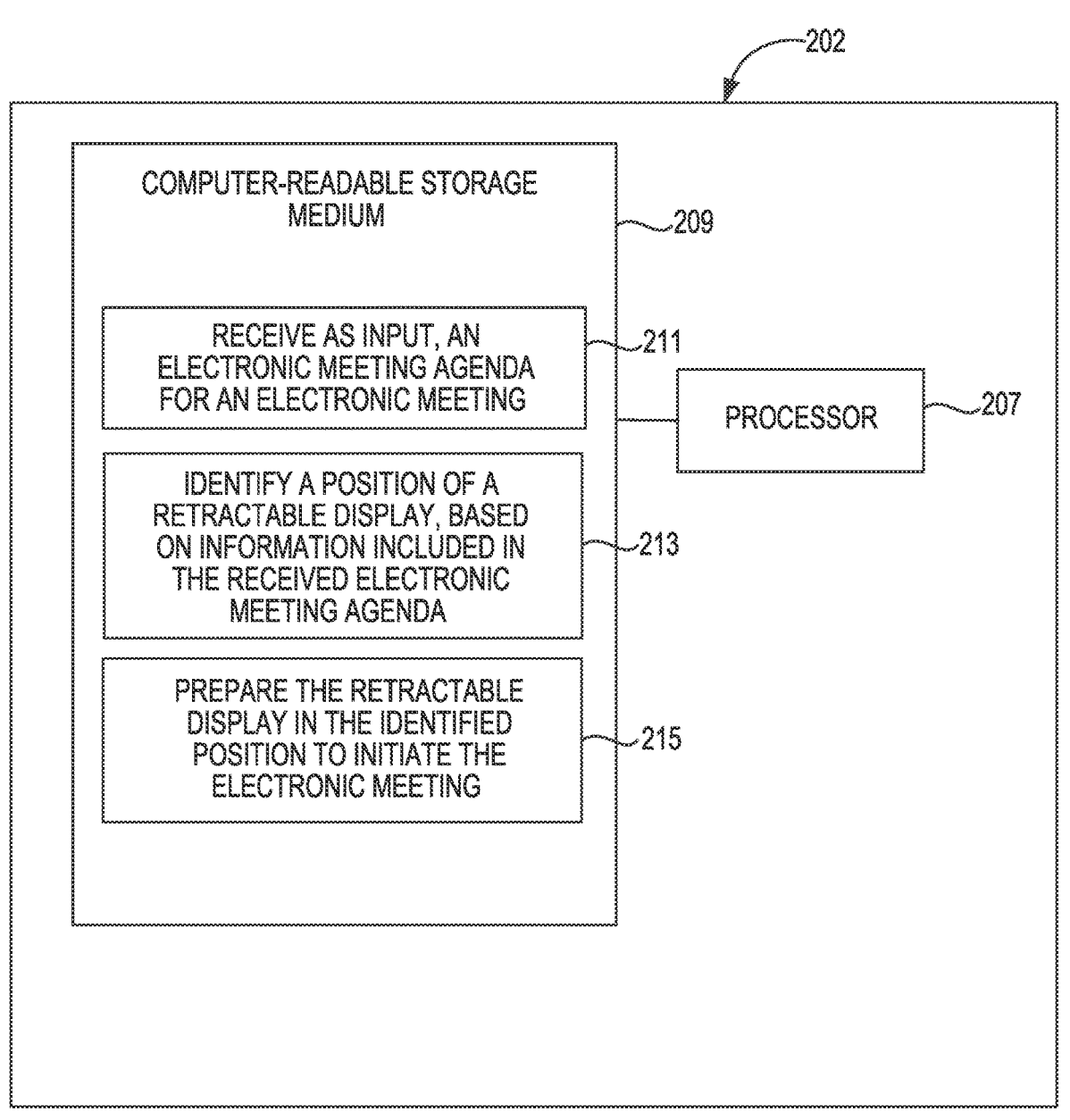
FIG. 2 illustrates an example block diagram of a computing device including instructions for conducting electronic meetings using retractable displays, in accordance with the present disclosure.

FIG. 2 illustrates an example block diagram of a computing device 202 including instructions for conducting electronic meetings using retractable displays, in accordance with the present disclosure. As illustrated in FIG. 2, the computing device 202 may include a processor 207, and a computer-readable storage medium 209. The computing device 202 may perform the method 100 illustrated in FIG. 1.

The processor 207 may be a central processing unit (CPU), a semiconductor-based microprocessor, and/or other hardware device suitable to control operations of the computing device 202. Computer-readable storage medium 209 may be an electronic, magnetic, optical, or other physical storage device that contains or stores executable instructions. Thus, computer-readable storage medium 209 may be, for example, Random Access Memory (RAM), an Electrically Erasable Programmable Read-Only Memory (EEPROM), a storage device, an optical disc, etc. In some examples, the computer-readable storage medium 209 may be a non-transitory storage medium, where the term 'non-transitory' does not encompass transitory propagating signals. As described in detail below, the computer-readable storage medium 209 may be encoded with a series of executable instructions 211-215.

As illustrated, the computer-readable storage medium 209 may store instructions 211 that, when executed, cause the computing device 202 to receive as input, an electronic meeting agenda for an electronic meeting. As discussed with regards to FIG. 1, the computing device 202 may comprise a conference hub and/or a portion of the conference hub. The computing device 202 may be used as a resource in conducting electronic meetings, and may therefore be reserved as a resource when electronic meetings are scheduled. As such, the computing device 202 may receive an electronic meeting agenda at a time of creation of the electronic meeting and/or at a time when the computing device 202 is reserved as a resource for the electronic meeting.

The computer-readable storage medium 209 may store instructions 213 that, when executed, cause the computing device 202 to identify a position of a retractable display, based on information included in the received electronic meeting agenda. As discussed with regards to FIG. 1, the position of the retractable display may be identified based on contextual information included in the electronic meeting agenda, based on information extrapolated from the contextual information included in the electronic meeting agenda such as using artificial intelligence, and/or by express selection of a presentation mode which is included in the electronic meeting agenda.

For instance, in some examples, the instructions 213 to identify the position of the retractable display include instructions that when executed cause the computing device 202 to select a notification mode of operation for the retractable display based on a determination that a presentation is not included in the information included in the received electronic meeting agenda. As another example, the instructions 213 to identify the position of the retractable display include instructions that when executed cause the computing device 202 to select a presentation mode of operation for the retractable display based on a determination that a presentation is included in the information included in the received electronic meeting agenda. Yet further, the instructions 213 to identify the position of the retractable display include instructions that when executed cause the computing device 202 to select the position of a retractable display, based on a selection of a display included in the received electronic meeting agenda.

In some examples, the instructions 213 to identify the position of the retractable display include instructions that when executed cause the computing device 202 to identify the position of the retractable display, based on a context of the electronic meeting. As discussed herein, the context of the electronic meeting may include keywords included in the electronic meeting agenda, determinations of geographic locations of participants in the electronic meeting, and/or materials to be discussed during the electronic meeting.

As illustrated in FIG. 2, the computer-readable storage medium 209 may store instructions 215 that, when executed, cause the computing device 202 to prepare the retractable display in the identified position to initiate the electronic meeting. For instance, at the time of the electronic meeting and/or in advance of the electronic meeting, the computing device 202 may automatically prepare the retractable display in the identified position, so that the retractable display is ready for the electronic meeting.

Figure 3:
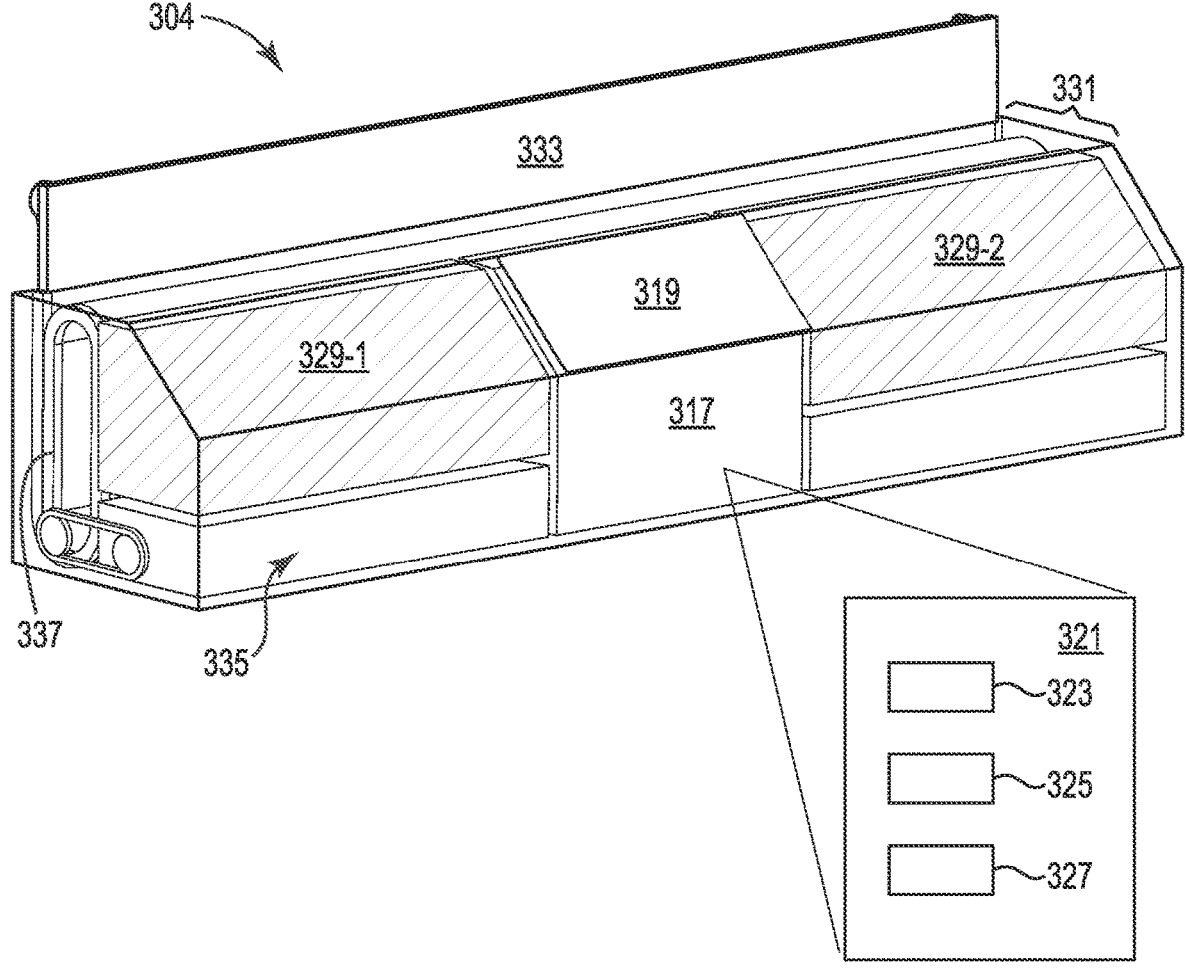
FIG. 3 illustrates an example apparatus for conducting electronic meetings using retractable displays, in accordance with the present disclosure.

FIG. 3 illustrates an example apparatus 304 for conducting electronic meetings using retractable displays, in accordance with the present disclosure. As discussed with regards to FIG. 1, the apparatus 304 may include a number of components. The apparatus 304 is also referred to herein as a conference hub. As illustrated, the apparatus 304 includes a processor 317, a retractable display area 331 to generate a visual display based on a communication from the processor 317, and a non-transitory computer-readable storage medium 321. The processor 317 may be the same and/or similar to the processor 207 illustrated in FIG. 2. The non-transitory computer-readable storage medium 321 may be the same and/or similar to the computer-readable storage medium 209 illustrated in FIG. 2. Accordingly, the apparatus 304 may perform the method 100 illustrated in FIG. 1 and/or execute the instructions 211-215 illustrated in FIG. 2.

The processor 317 may be a central processing unit (CPU), a semiconductor-based microprocessor, and/or other hardware device suitable to control operations of the apparatus 304. Computer-readable storage medium 321 may be an electronic, magnetic, optical, or other physical storage device that contains or stores executable instructions. Thus, computer-readable storage medium 321 may be, for example, Random Access Memory (RAM), an Electrically Erasable Programmable Read-Only Memory (EEPROM), a storage device, an optical disc, etc. In some examples, the computer-readable storage medium 321 may be a non-transitory storage medium, where the term 'non-transitory' does not encompass transitory propagating signals. As described in detail below, the computer-readable storage medium 321 may be encoded with a series of executable instructions 323-327.

In some examples, the apparatus 304 may include a removable graphic user interface 319 communicatively coupled to the processor 317. The graphic user interface may include a touch screen display to control the apparatus 304. In some examples, the removable graphic user interface 319 is to receive user interface input to control the apparatus 304. For instance, the removable graphic user interface 319 may receive input from a user requesting that the apparatus 304 change from one mode of operation to another. The removable graphic user interface 319 may receive different and/or additional input from a user to control the apparatus 304. For instance, the removable graphic user interface 319 may allow a user to change an audio output of the apparatus 304, to change the output of speaker sub-assemblies 329-1 and 329-2, to invite different and/or additional participants to the meeting, and/or to change other features of the electronic meeting.

The apparatus 304 may also include an audio system comprising speaker sub-assemblies 329-1 and 329-2. The apparatus 304 may also include a retractable display area 331. As discussed herein, the retractable display area refers to or includes a visual display that is capable of extending from a retractable display area of the conference hub, and of being enclosed within the retractable display area of the conference hub, and/or being projected from the retractable display area of the conference hub.

In some examples, the retractable display area includes an optical waveguide for transmitting and distributing optical signals in a presentation mode of operation. As a non-limiting example, the optical waveguide may be in the form of a hollow metal waveguide, and the apparatus 304 may include a plurality of hollow metal waveguides for carrying light pulses as optical data signals. Light pulses that constitute data signals may be generated by a light source in the apparatus 304, such as a vertical-cavity surface-emitting laser (VCSEL). The output of the light source may be flexibly coupled to the hollow metal waveguide by means of an optical fiber included in the apparatus 304, as well as optical imaging components such as lenses also included in apparatus 304.

In the example illustrated in FIG. 3, the retractable display area includes a flexible display 333, and a motor assembly 335 to change positions of the flexible display 333. As illustrated in FIG. 3, the apparatus 304 is large enough to house the display 333 when it is fully retracted in the closed mode of operation and/or when it is partially retracted in the notification mode of operation. The apparatus 304 may also include a plurality of display guide rails to support the retractable display 333 in a presentation mode of operation. FIG. 3 illustrates a single guide rail 337, though FIGS. 4D and 4E illustrate a plurality of guide rails.

In various examples, the non-transitory computer-readable storage medium 321 may comprise instructions 323 that when executed cause the processor 317 to receive as input, an electronic meeting agenda for an electronic meeting. For instance, the apparatus 304 may serve as a resource used for electronic meetings, and may receive via processor 317, an electronic meeting agenda as discussed herein.

The non-transitory computer-readable storage medium 321 may comprise instructions 325 that when executed cause the processor 317 to identify a position of the retractable display, based on the received electronic meeting agenda. For instance, as discussed with regards to FIG. 2, the position of the retractable display may be identified based on a location of attendees in the electronic meeting, based on presentation materials of the electronic meeting, or combinations thereof. As such, the instructions 325, when executed, may cause the processor 317 to identify the position of the retractable display, based on a location of attendees in the electronic meeting, based on presentation materials of the electronic meeting, or combinations thereof.

The non-transitory computer-readable storage medium 321 may comprise instructions 327 that when executed cause the processor 317 to prepare the retractable display in the identified position to initiate the electronic meeting. For instance, as discussed with regards to FIG. 4A, FIG. 4B, and/or FIG. 4C, among others, the apparatus 304 may prepare the retractable display 333 in the identified position at the time of and/or in advance of the electronic meeting.

Figure 4A:
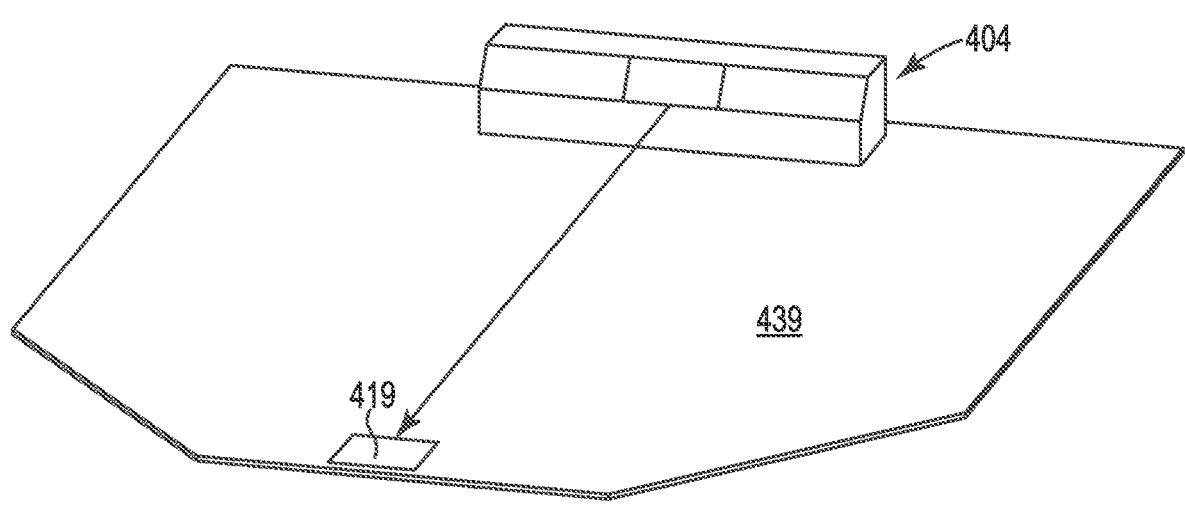
FIGS. 4A, 4B, 4C, 4D, and 4E illustrate example modes of operation of an example apparatus for conducting electronic meetings using retractable displays, in accordance with the present disclosure.
Figure 4B:
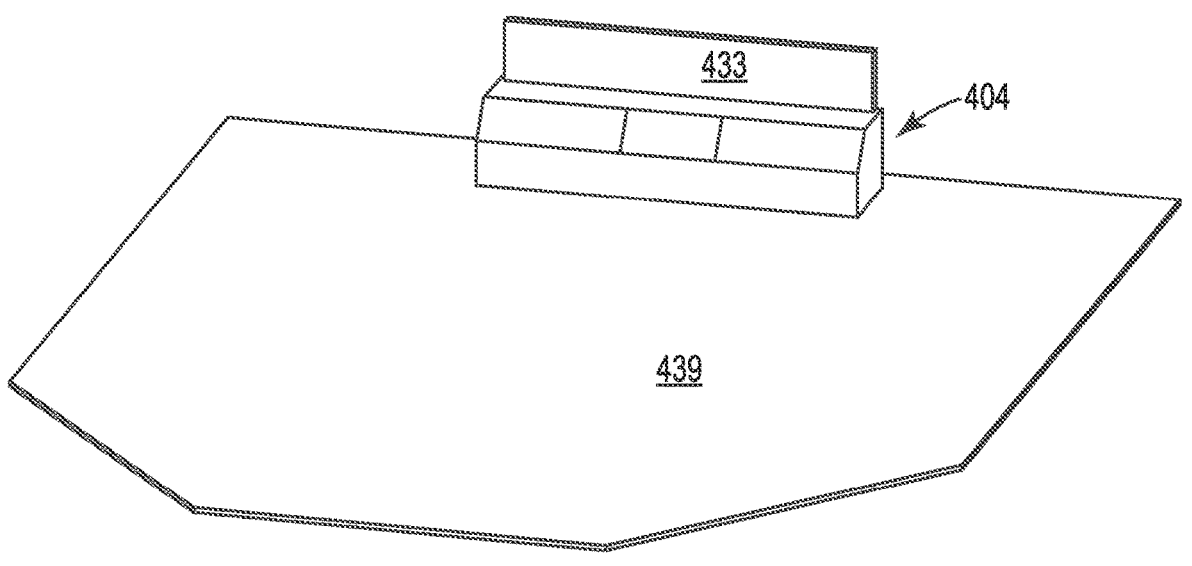
Figure 4C:
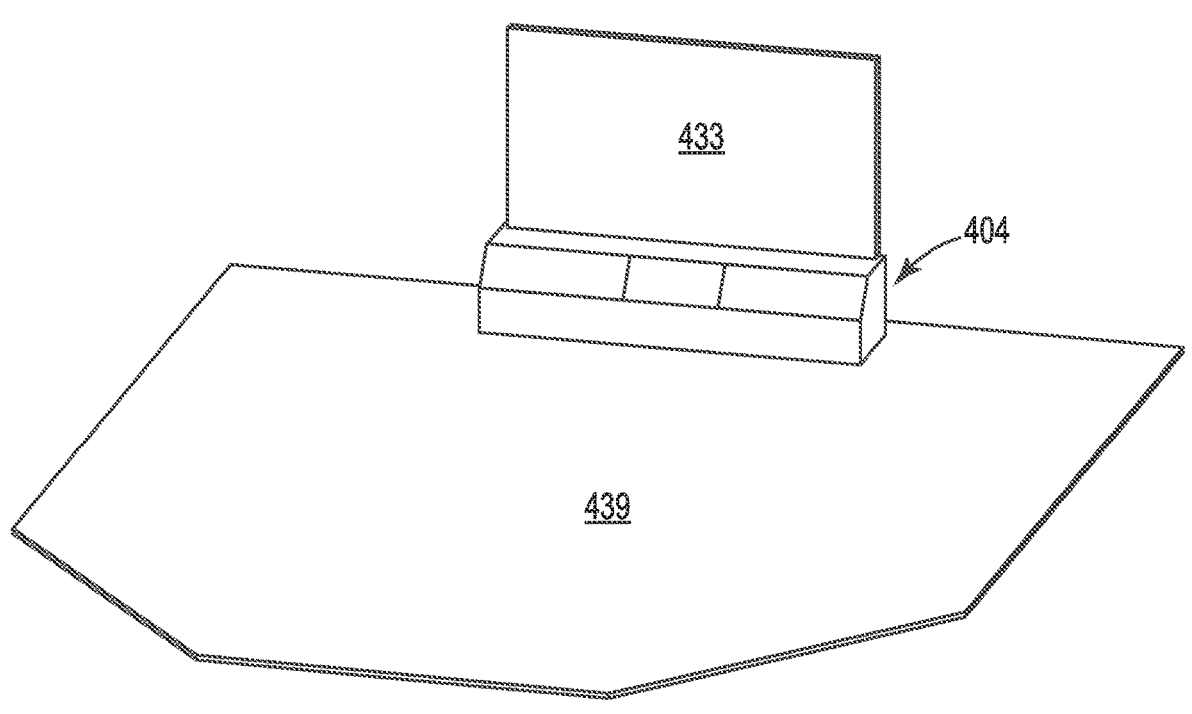
Figure 4D:
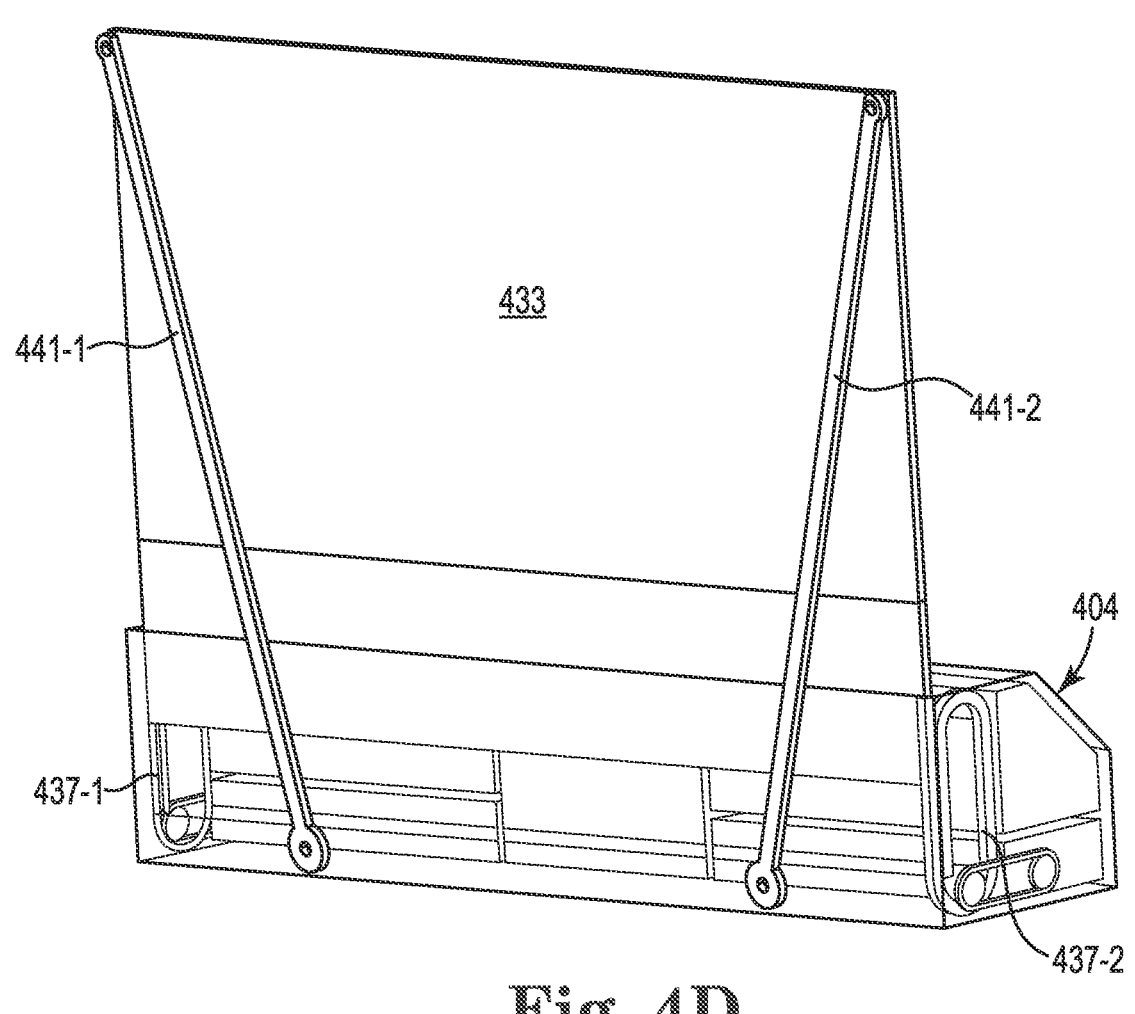
Figure 4E:
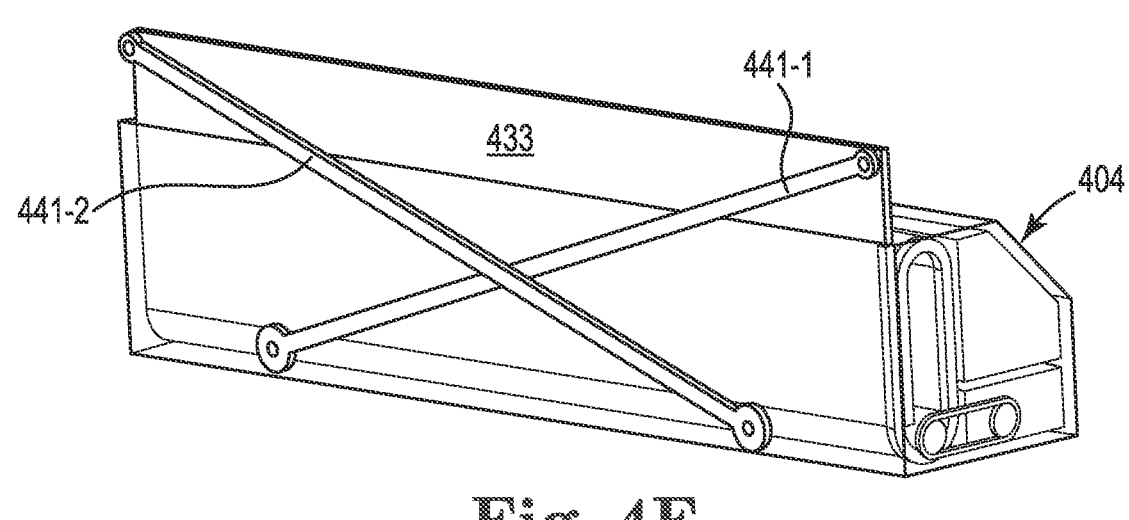

FIGS. 4A, 4B, 4C, 4D, and 4E illustrate example modes of operation of an example apparatus 404 for conducting electronic meetings using retractable displays, in accordance with the present disclosure. As discussed herein, the apparatus 404 may include a number of components. The apparatus 404 may be the same as and/or similar to the apparatus 304 illustrated in FIG. 3. The apparatus 404 is also referred to herein as a conference hub. FIG. 4A illustrates a closed mode of operation in which the retractable display is not extended from the apparatus 404. In the closed mode of operation, the apparatus 404 may be placed on a conference table, the floor, and/or another surface 439. As illustrated in FIG. 4A, the retractable display is not extended in the closed mode of operation. In various examples, the removable graphic user interface 419 may be removed from the apparatus 404 and may be used to control the apparatus 404. Although FIG. 4B, FIG. 4C, FIG. 4D, and FIG. 4E do not illustrate the removable graphic user interface removed from the apparatus 404, the removable graphic user interface may be removed from the apparatus 404 in any of the modes of operation.

FIG. 4B illustrates a notification mode of operation in which the retractable display is partially extended from the apparatus 404. For instance, the retractable display 433 extends away from the surface 439, but not to the extent illustrated in the presentation mode of operation illustrated in FIG. 4C. In the notification mode of operation, the retractable display 433 may include a short display could be used to display next meeting countdown, Wi-Fi password, reminders, etc. As another example, when there is no meeting in progress, the retractable display 433 may minimize to the notification mode of operation and show next meeting details.

FIG. 4C illustrates a presentation mode of operation in which the retractable display is fully extended from the apparatus 404. When the retractable display 433 is extended in the presentation mode of operation, a plurality of display guide rails 437-1, and 437-2, and a display vertical support may support the retractable display 433, as illustrated in FIG. 4D. The plurality of display guide rails 437-1 and 437-2 may guide the retractable display 433 vertically from the apparatus 404. The display vertical support may include one or a plurality of solid structures to support the retractable display 433 in the presentation mode. For instance, as illustrated in FIG. 4D, vertical supports 441-1 and 441-2 may extend a length of the retractable display to support the retractable display 433 in the presentation mode of operation. The vertical supports 441-1 and 441-2 may operate in collaboration with the motor assembly (i.e., 335 illustrated in FIG. 3) to extend the retractable display 433 from the apparatus 404.

Similarly, the vertical supports 441-1 and 441-2 may assist with returning the retractable display 433 to a notification mode of operation and/or a closed mode of operation. For instance, as illustrated in FIG. 4E, the vertical supports 441-1 and 441-2 may fold inwards, overlapping one another so as to fold into the apparatus 404. In such examples, the apparatus 404 may include a track and/or other guide structure along a base of the apparatus 404 upon which the vertical supports 441-1 and 441-2 may glide when switching between different modes of operation.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
    receiving by a conference hub including a retractable display, an electronic meeting agenda for an electronic meeting;
    identifying a position of the retractable display by extrapolating contextual information from the received electronic meeting agenda, by identifying a selection of a display included in the received electronic meeting agenda, or combinations thereof; and
    initiating the electronic meeting by preparing the retractable display in the identified position.

2. The method of claim 1, wherein identifying the position of the retractable display includes:
    selecting a closed mode of operation in which the retractable display is enclosed within the conference hub responsive to a determination that a visual display will not be included in the electronic meeting;
    selecting a notification mode of operation where the retractable display is partially extended from the conference hub responsive to a determination that notifications will be included in the electronic meeting and that a visual display will not be included in the electronic meeting; and
    selecting a presentation mode of operation where the retractable display is fully extended from the conference hub responsive to a determination that a visual display will be included in the electronic meeting.

3. The method of claim 1, wherein identifying the position of the retractable display includes selecting a mode of operation of the retractable display based on keywords identified in the electronic meeting agenda.

4. The method of claim 1, further including:
    extrapolating contextual information during the electronic meeting; and
    revising the position of the retractable display during the electronic meeting and based on the extrapolated contextual information.

5. The method of claim 1, further including:

revising the position of the retractable display during the electronic meeting and responsive to user input received by the conference hub.

6. A non-transitory computer-readable storage medium comprising instructions that when executed cause a computing device to:

receive as input, an electronic meeting agenda for an electronic meeting;

identify a position of a retractable display, based on information included in the received electronic meeting agenda; and prepare the retractable display in the identified position to initiate the electronic meeting.

7. The medium of claim 6, wherein the instructions to identify the position of the retractable display include instructions that when executed cause the computing device to select a notification mode of operation for the retractable display based on a determination that a presentation is not included in the information included in the received electronic meeting agenda.

8. The medium of claim 6, wherein the instructions to identify the position of the retractable display include instructions that when executed cause the computing device to select a presentation mode of operation for the retractable display based on a determination that a presentation is included in the information included in the received electronic meeting agenda.

9. The medium of claim 6, wherein the instructions to identify the position of the retractable display include instructions that when executed cause the computing device to select the position of a retractable display, based on a selection of a display included in the received electronic meeting agenda.

10. The medium of claim 6, wherein the instructions to identify the position of the retractable display include instructions that when executed cause the computing device to identify the position of the retractable display, based on a context of the electronic meeting.

11. An apparatus, comprising:

a processor;

a retractable display area to generate a visual display based on a communication from the processor; and a non-transitory computer-readable storage medium comprising instructions that when executed cause the processor to:

receive as input, an electronic meeting agenda for an electronic meeting;

identify a position of the retractable display, based on the received electronic meeting agenda; and prepare the retractable display in the identified position to initiate the electronic meeting.

12. The apparatus of claim 11, further including a removable graphic user interface communicatively coupled to the processor, the removable graphic user interface to receive user interface input to control the apparatus.

13. The apparatus of claim 11, wherein the retractable display area includes a flexible display, the apparatus further including a plurality of display guide rails and a display vertical support operable to support the retractable display in a presentation mode of operation.

14. The apparatus of claim 11, wherein the retractable display area includes an optical waveguide for transmitting and distributing optical signals in a presentation mode of operation.

15. The apparatus of claim 11, wherein the non-transitory computer-readable storage medium includes instructions that when executed cause the processor to identify the position of the retractable display, based on a location of attendees in the electronic meeting, based on presentation materials of the electronic meeting, or combinations thereof.

16. The method of claim 1, wherein identifying the position of the retractable display includes selecting a notification mode of operation where the retractable display is partially extended from the conference hub.

17. The method of claim 1, wherein identifying the position of the retractable display includes: extrapolating contextual information from the received electronic meeting agenda with artificial intelligence and identifying the position of the retractable display with artificial intelligence.

18. The medium of claim 6, wherein the position of the retractable display is identified by extrapolating contextual information from the received electronic meeting agenda and by identifying a selection of a display included in the received electronic meeting agenda.

19. The medium of claim 6, wherein the retractable display positions include a closed mode of operation, notification mode of operation, and retractable mode of operation, and the retractable display is in a different position in each mode of operation.

20. The medium of claim 6, wherein the instructions further cause the computing device to:

identify that a presentation is complete and the electronic meeting has not yet concluded, and revise the position of the retractable display from a presentation mode of operation to a notification mode of operation.

\* \* \* \* \*